US008768400B2

(12) United States Patent
Charipadi et al.

(10) Patent No.: US 8,768,400 B2
(45) Date of Patent: Jul. 1, 2014

(54) COMMUNICATION UNIT AND METHOD FOR SELECTIVE FREQUENCY SYNCHRONIZATION IN A CELLULAR COMMUNICATION NETWORK

(75) Inventors: Gopikrishna Charipadi, Bangalore (IN); John Yearsley Bromell, Saffron Walden (GB)

(73) Assignee: ip.access Limited, Cambourne, Cambridgeshire (GB)

( * ) Notice: Subject to any disclaimer, the term of this patent is extended or adjusted under 35 U.S.C. 154(b) by 617 days.

(21) Appl. No.: 13/061,659

(22) PCT Filed: Jun. 25, 2009

(86) PCT No.: PCT/EP2009/057979
§ 371 (c)(1),
(2), (4) Date: Jun. 22, 2011

(87) PCT Pub. No.: WO2010/025970
PCT Pub. Date: Mar. 11, 2010

(65) Prior Publication Data
US 2011/0275402 A1    Nov. 10, 2011

(30) Foreign Application Priority Data

Sep. 2, 2008    (GB) .................................. 0815941.0

(51) Int. Cl.
*H04W 52/04* (2009.01)
(52) U.S. Cl.
USPC ........................................... 455/522; 455/447
(58) Field of Classification Search
CPC ............................... H04W 52/24; H04W 16/12
USPC ........................................................ 455/522
See application file for complete search history.

(56) References Cited

U.S. PATENT DOCUMENTS 5,218,343 A * 6/1993 Stobbe et al. ............... 340/573.4
5,450,617 A * 9/1995 Moore ............................ 455/71
(Continued)

FOREIGN PATENT DOCUMENTS

CN    101197610    6/2008
EP    1587221    10/2005
(Continued)

OTHER PUBLICATIONS

Ericsson: "UE measurements and reporting of global cell identity" 3GPP Draft; R2-074097, 3rd Generation Partnership Project (3GPP), Mobile Competence Centre; vol. RAN WG2, No. Shanghai China 20071008, Oct. 1, 2007.

(Continued)

*Primary Examiner* — Hai V Nguyen
(74) *Attorney, Agent, or Firm* — Fitch Even Tabin & Flannery LLP (57) ABSTRACT

A communication unit comprises a receiver for receiving radio frequency (RF) signals from at least one wireless serving communication unit, and signal processing logic module arranged to decode information within the received RF signals is the at least one wireless serving communication unit. The signal processing logic module is further arranged to decode transmit power information in a received RF signal from the at least one wireless serving communication unit, and determine from the decoded transmit power information whether a transmission from the at least one wireless serving communication unit is suitable for use as a timing reference. If it is determined that the transmission from the at least one wireless serving communication unit is suitable for use as a timing reference, the communication unit synchronizes an operating frequency to the received RF signal of the at least one wireless serving communication unit.

23 Claims, 4 Drawing Sheets

(56) References Cited

U.S. PATENT DOCUMENTS

| | | | | |
|---|---|---|---|---|
| 5,619,504 A * | 4/1997 | Van Grinsven et al. | | 370/347 |
| 5,699,430 A * | 12/1997 | Krizay et al. | | 340/5.26 |
| 5,802,463 A * | 9/1998 | Zuckerman | | 455/208 |
| 5,838,254 A * | 11/1998 | Kokubu et al. | | 340/10.34 |
| 6,094,576 A * | 7/2000 | Hakkinen et al. | | 455/422.1 |
| 6,166,990 A * | 12/2000 | Ooishi et al. | | 365/233.11 |
| 6,226,337 B1 * | 5/2001 | Klank et al. | | 375/367 |
| 6,608,552 B1 * | 8/2003 | Fogel et al. | | 340/12.32 |
| 6,630,872 B1 * | 10/2003 | Lanoue et al. | | 331/176 |
| 6,703,906 B2 * | 3/2004 | Babcock | | 331/158 |
| 6,771,978 B1 * | 8/2004 | Kayama et al. | | 455/522 |
| 6,775,250 B1 * | 8/2004 | Norimatsu | | 370/311 |
| 6,965,585 B2 * | 11/2005 | Grilli et al. | | 370/331 |
| 6,978,125 B2 * | 12/2005 | Lindell et al. | | 455/183.1 |
| 6,990,324 B2 * | 1/2006 | Laroia et al. | | 455/226.1 |
| 7,023,902 B2 * | 4/2006 | Sih et al. | | 375/147 |
| 7,289,473 B1 * | 10/2007 | Padovani et al. | | 370/332 |
| 7,706,765 B2 * | 4/2010 | Collins et al. | | 455/229 |
| 7,783,311 B2 * | 8/2010 | Takiishi et al. | | 455/502 |
| 7,826,577 B2 * | 11/2010 | Bienek et al. | | 375/354 |
| 7,969,930 B2 * | 6/2011 | Kalhan | | 370/328 |
| 7,978,667 B2 * | 7/2011 | Kalhan | | 370/338 |
| 8,031,652 B2 * | 10/2011 | Fong | | 370/322 |
| 8,102,825 B2 * | 1/2012 | Kalhan | | 370/338 |
| 8,111,189 B2 * | 2/2012 | Abraham et al. | | 342/357.62 |
| 8,219,103 B2 * | 7/2012 | Charipadi et al. | | 455/447 |
| 8,271,040 B2 * | 9/2012 | Piercy et al. | | 455/560 |
| 8,428,002 B2 * | 4/2013 | Gonikberg et al. | | 370/328 |
| 8,457,079 B2 * | 6/2013 | Krishnamurthy et al. | | 370/336 |
| 8,476,982 B2 * | 7/2013 | Simic et al. | | 331/18 |
| 8,553,729 B2 * | 10/2013 | Zhang | | 370/503 |
| 8,565,204 B2 * | 10/2013 | Kalhan | | 370/338 |
| 8,565,807 B2 * | 10/2013 | Michel et al. | | 455/522 |
| 2001/0001616 A1 * | 5/2001 | Rakib et al. | | 375/259 |
| 2001/0004375 A1 * | 6/2001 | Partyka | | 375/135 |
| 2002/0149435 A1 * | 10/2002 | Babcock | | 331/158 |
| 2003/0072358 A1 * | 4/2003 | Gurney et al. | | 375/149 |
| 2003/0072445 A1 * | 4/2003 | Kuhlman et al. | | 380/42 |
| 2003/0142649 A1 * | 7/2003 | Taniguchi | | 370/336 |
| 2003/0156603 A1 * | 8/2003 | Rakib et al. | | 370/485 |
| 2003/0174757 A1 * | 9/2003 | Partyka | | 375/132 |
| 2004/0028160 A1 * | 2/2004 | Bienek et al. | | 375/354 |
| 2004/0179510 A1 * | 9/2004 | Kuffner et al. | | 370/350 |
| 2005/0135318 A1 * | 6/2005 | Walton et al. | | 370/338 |
| 2005/0281320 A1 * | 12/2005 | Neugebauer | | 375/141 |
| 2006/0045038 A1 * | 3/2006 | Kay et al. | | 370/316 |
| 2006/0135070 A1 * | 6/2006 | Karabinis | | 455/63.1 |
| 2006/0172781 A1 * | 8/2006 | Mohebbi | | 455/571 |
| 2008/0061967 A1 * | 3/2008 | Corrado | | 340/539.26 |
| 2008/0130596 A1 * | 6/2008 | Kalhan | | 370/338 |
| 2008/0130598 A1 * | 6/2008 | Kalhan | | 370/338 |
| 2008/0153497 A1 * | 6/2008 | Kalhan | | 455/436 |
| 2008/0211561 A1 * | 9/2008 | Kurokawa et al. | | 327/291 |
| 2009/0029645 A1 * | 1/2009 | Leroudier | | 455/7 |
| 2009/0097452 A1 * | 4/2009 | Gogic | | 370/331 |
| 2009/0137241 A1 * | 5/2009 | Yavuz et al. | | 455/423 |
| 2009/0156213 A1 * | 6/2009 | Spinelli et al. | | 455/436 |
| 2009/0215400 A1 * | 8/2009 | Chang et al. | | 455/67.14 |
| 2009/0252099 A1 * | 10/2009 | Black et al. | | 370/329 |
| 2009/0318193 A1 * | 12/2009 | Littlefield et al. | | 455/561 |
| 2010/0020771 A1 * | 1/2010 | Ji et al. | | 370/336 |
| 2010/0099449 A1 * | 4/2010 | Borran et al. | | 455/501 |
| 2010/0151870 A1 * | 6/2010 | Piercy et al. | | 455/450 |
| 2011/0070881 A1 * | 3/2011 | Hwang et al. | | 455/423 |
| 2011/0077035 A1 * | 3/2011 | Charipadi et al. | | 455/507 |
| 2011/0141895 A1 * | 6/2011 | Zhang | | 370/235 |
| 2011/0156953 A1 * | 6/2011 | Abraham et al. | | 342/357.62 |
| 2011/0159901 A1 * | 6/2011 | Frenger et al. | | 455/502 |
| 2011/0190027 A1 * | 8/2011 | Michel et al. | | 455/522 |
| 2011/0275402 A1 * | 11/2011 | Charipadi et al. | | 455/522 |
| 2014/0057637 A1 * | 2/2014 | Hoang et al. | | 455/445 |

FOREIGN PATENT DOCUMENTS

| | | |
|---|---|---|
| GB | 2441372 | 3/2008 |
| WO | 01/35564 | 5/2001 |

OTHER PUBLICATIONS

3GPP Technical Specification (TS) 25.104.
3GPP Technical Specification (TS) 25.215.
Search Report for GB0815941.0 dated Dec. 11, 2008.
International Search Report for PCT/EP2009/057979 dated Oct. 28, 2009.

* cited by examiner

COMMUNICATION UNIT AND METHOD FOR SELECTIVE FREQUENCY SYNCHRONIZATION IN A CELLULAR COMMUNICATION NETWORK

CROSS REFERENCE TO RELATED APPLICATIONS

This application is a national phase application of International Application No. PCT/EP2009/057979, filed Jun. 25, 2009, claiming priority to Great Britain Application No. 0815941.0, filed Sep. 2, 2008, both of which are incorporated by reference herein in their entirety.

FIELD OF THE INVENTION

The field of the invention relates to a wireless communication unit and method for synchronising therein. In particular, the field of the invention relates to a 3GPP wireless communication unit synchronising to macro cell base stations in a combined macro cell/femto cell cellular communication system.

BACKGROUND OF THE INVENTION

Wireless communication systems, such as the $2^{nd}$ Generation (2G) (otherwise referred to as Global System for Mobile (GSM) communications and the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3gpp.org).

Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more communication cells to which UEs may attach, and thereby connect to the network.

The $3^{rd}$ generation of wireless communications has been developed for macro-cell mobile phone communications. Such macro cells utilise high power base stations (NodeBs in 3GPP parlance) to communicate with UEs operating within a relatively large coverage area.

Lower power (and therefore smaller coverage area) femto-cells or pico-cells are a recent development within the field of wireless cellular communication systems. Femto-cells or pico-cells (with the term femto-cell being used hereafter to encompass pico-cell or similar) are classified under local area base stations in the 3GPP standard specifications.

Femto cells are effectively communication coverage areas supported by low power base stations (otherwise referred to as Access Points (APs)). These cells are able to be piggy-backed onto the more widely used macro-cellular network and support communications to UEs in a restricted, for example 'in-building', environment. Typical applications for such femto-cell APs include, by way of example, residential and commercial (e.g. office) locations, 'hotspots', etc, whereby an AP can be connected to a core network via, for example, the Internet using a broadband connection or the like. In this manner, femto-cells can be provided in a simple, scalable deployment in specific in-building locations, since the quality of services (voice/data) suffer due to massive attenuation of macro cell transmissions going through concrete walls or metallised glass planes in order to reach the user in-building.

In a femto cell network it is known that there may be a very large number of femto cells compared to the number of macro cells; with femto cells often residing within, or overlapping, macro cells in the same geographic area.

Often, a Voltage Controlled Temperature Compensated Crystal Oscillator (VCTCXO) is used to generate a desired (reference) operating frequency for wireless communication units. Such crystal oscillators have been employed in UE receivers operating in macro cells, and are also considered for use in femto cells. Although VCTCXOs are inexpensive, and therefore an attractive frequency reference component for wireless communication unit designers, they are known to suffer from frequency drift from their quiescent operating frequency, which is dependent upon the age of, and any temperature variations affecting, the VCTCXO.

Local oscillator (LO) frequencies for the radio receiver, transmitter and the sampling clocks for baseband data converters (for example analogue-to-digital converters (ADCs) and digital-to-analogue converters (DACs)), are derived from the frequency reference generated by the crystal oscillator. Hence, this frequency drift in the crystal oscillator needs to be carefully controlled; otherwise reference frequency drift will lead to degradation of performance in many aspects of the receiver. Worse still, reference frequency drift may eventually render the receiver incapable of decoding received signals due to frequency drifting outside a receiver 'lock' range. Moreover, from a transmission point of view, a communication unit is not allowed to transmit 3G signals at a frequency error greater than +/−0.1 parts per million, PPM, as per the 3GPP transmitter specifications for local area base stations (femto cells).

In macro cell communications, base stations, often referred to as NodeBs, are guaranteed to have high frequency stability, as they employ expensive and, hence, highly stable crystal oscillators. The maximum frequency drift specification of macro cells, according to $3^{rd}$ Generation Partnership Project (3GPP) specifications, is +/−0.05 PPM. Notably, this high accuracy macro cell reference frequency compares favourably to the lower accuracy performance of femto cell VCTCXO crystal oscillators, which are typically in a region of less than +/−10 PPM.

Clearly, it is of paramount importance that a femto cell communication unit receiver is in frequency lock with the most stable, accurate transmitter that it is receiving signals from, in order to correctly decode signals. Furthermore, it is important to achieve this high frequency accuracy before the receiver baseband modem attempts to decode the received channels. A desired frequency accuracy performance before decoding would be to reduce the frequency drift down to between +/−0.1 PPM and +/−0.2 PPM. This process of reducing the frequency drift within the receiver's decoding requirements is termed 'frequency synchronisation'.

Though the frequency accuracy required for decoding is +/−0.1 PPM, the femto cell VCTCXO crystal has to be synchronised to a much greater accuracy. This is because the macro cell to which the femto cell VCTCXO crystal synchronises has a frequency accuracy of +/−0.05 PPM as mentioned before. This leaves the VCTCXO with a remaining accuracy budget of +/−0.05 PPM, out of which +/−0.03 PPM is reserved for variation due to, for example, temperature variations. As a result, the VCTCXO frequency error has to be maintained at a frequency accuracy of within +/−0.02 PPM. This frequency accuracy requirement is termed 'fine frequency synchronisation'.

Existing state of the art frequency synchronisation procedures, for example those employed within UEs, directly retune the wireless communication unit's hardware VCTCXO crystal to iteratively correct an estimated frequency error. This synchronises the VCTCXO crystal to any received RF signal, since it is assumed that the received RF signal originates from a stable reference, such as a macro cell's Node B. Furthermore, it is known that such frequency synchronisation procedures frequency lock to every received individual base station (previously every macro cell NodeB), in turn, in order to select the best frequency to synchronise its operating frequency to.

In femto cells, it is proposed that femto cell access points (APs) incorporate a downlink (DL) receiver radio sub-system, in a similar manner to a UE receiver, in order to wirelessly receive transmissions from other wireless serving communication units, such as NodeBs and other femto cell APs.

It is also proposed that a femto cell AP is able to scan for, receive, and decode transmissions from base stations, including macro cell and other femto cell base stations, in a manner that is termed Network Listen. A Network Listen operation may operate with base stations belonging to the same network as the femto cell AP or a different network, and with base stations on the same or different frequency band(s) as the femto cell AP. A Network Listen operation may also operate with both 2G and 3G base stations.

However, in a typical femto cell environment, it is likely that, in addition to macro cells, there will be many other femto cells in the residential neighbourhood. Hence, it is highly probable that the femto cell's DL receiver could frequency lock with both femto cell and macro cell reference frequency signals. As a result, the accuracy of the reference frequency signals with which the receiver is frequency locked cannot be guaranteed, due to the likelihood of at least some of them originating from a femto cell, as opposed to a macro cell.

In order to obtain accurate fine frequency estimation from such a likely combination of femto cell and macro cell reference signals, it would be necessary to filter the frequency estimate over a long period of time (typically tens or even hundreds of frames in the case of low signal-to-noise ratio conditions). However, such a process would consume most of the available time during a Network Listen process for each cell. Accordingly, it is not desirable that a femto cell DL receiver synchronises to another femto cell AP, since femto cell APs will typically employ inexpensive and therefore less accurate VCTCXO crystals.

Thus, there exists a need for a method and apparatus for fine frequency synchronisation in a cellular communication unit, particularly one for a 3GPP femto cell using inexpensive VCTCXO crystal oscillator in a 3GPP combined femto cell/macro cell communication network, which aims to address at least some of the shortcomings of past and present techniques and/or mechanisms.

SUMMARY OF THE INVENTION

Accordingly, the invention seeks to mitigate, alleviate or eliminate one or more of the abovementioned disadvantages singly or in any combination.

According to a first aspect of the invention, there is provided a communication unit capable of communicating in a wireless communication network. The communication unit comprises a receiver for receiving radio frequency (RF) signals from at least one wireless serving communication unit, and a signal processing logic module arranged to decode transmit power information from a received RF signal sent by the at least one wireless serving communication unit and to determine from the decoded transmit power information whether a transmission from the at least one wireless serving communication unit is suitable for use as a timing reference. If it is determined, from the decoded transmit power information, that the transmission is suitable for use as a timing reference, the wireless communication unit synchronises an operating frequency of the communication unit to the received RF signal of the at least one wireless serving communication unit.

In this manner, the signal processing logic module is able to differentiate between a reliable timing reference source, such as a macro cell NodeB, and an unreliable timing reference source, such as a femto cell AP, based on the respective transmit power information, for example as described in greater detail below. Accordingly, the wireless communication unit is able to selectively synchronise and fine frequency lock only with those timing reference sources that are deemed reliable, and therefore suitable.

In one optional embodiment of the invention, the signal processing logic module may be arranged to decode transmit power information received on a common channel broadcast by the at least one wireless serving communication unit, and to determine from the decoded common channel transmit power information whether the transmission from the at least one wireless serving communication unit is suitable for use as a timing reference. In particular, the signal processing logic module may be arranged to decode a system information message within the received RF signal, the system information message comprising the transmit power information for the common channel broadcast by the at least one wireless serving communication unit. For example, the signal processing logic module may be arranged to decode transmit power information for a Primary Common Pilot CHannel (P-CPICH) of the at least one wireless serving communication unit, and to determine from the decoded transmit power for the primary CPICH whether the at least one wireless serving communication unit is suitable for use as a timing reference. In this manner, the inventive concept only requires supporting functionality to be provided within a femto cell and, thus, does not require supporting functionality to be provided within the core network.

In one optional embodiment of the invention, the signal processing logic module may be arranged to determine whether the transmission from the at least one wireless serving communication unit is suitable for use as a timing reference by comparing an extracted value within the decoded transmit power information to a threshold value. For example, if the value within the decoded transmit power information is less than the threshold value, the signal processing logic module may be arranged to determine that the at least one wireless serving communication unit is not suitable for use as a timing reference. Furthermore, in one optional embodiment, the threshold value may be configurable. In this manner, the properties of the transmit power information that determine whether a base station is suitable for use as a timing reference may be dynamically configured.

In one optional embodiment of the invention, the signal processing logic module may be arranged to configure the threshold value according to information received from a core network component of the wireless communication network.

In one optional embodiment of the invention, the signal processing logic module is further arranged, upon determining that the transmission from the at least one wireless serving communication unit is suitable for use as a timing reference, to determine whether the measured signal quality of the transmission received from the at least one wireless serving communication unit is above a further threshold. In particular, the further threshold may be Operator configurable, and the received quality measured may comprise at least one of CPICH EcNo (Common Pilot Channel Energy-per-chip-to-Noise) and CPICH RSCP (Common Pilot CHannel Received Signal Code Power).

In one optional embodiment of the invention, if it is determined that the at least one wireless serving communication unit is suitable for use as a timing reference, the signal processing logic module may be arranged to use the received RF signal of the at least one wireless serving communication unit to correct a frequency drift of a crystal oscillator from which the operating frequency of the wireless communication unit is derived.

In one optional embodiment of the invention, if it is determined that the at least one wireless serving communication unit is suitable for use as a timing reference, the signal processing logic module may be further arranged to use the received RF signal of the at least one wireless serving communication unit to update an aggregate frequency error estimation with which to correct a frequency drift of a crystal oscillator from which the operating frequency of the wireless communication unit is derived.

In one optional embodiment of the invention, the signal processing logic module is further arranged, prior to decoding transmit power information from the received RF signal, to coarse synchronise with at least one wireless serving communication unit.

In one optional embodiment of the invention, the signal processing logic module may be arranged to: determine from the decoded transmit power whether the at least one wireless serving communication unit comprises a femto cell access point; and if it is determined that the at least one wireless serving communication unit comprises a femto cell access point, to determine that the at least one wireless serving communication unit is unsuitable for use as a timing reference.

According to a second aspect of the invention, there is provided an integrated circuit. The integrated circuit comprises logic for receiving a Radio Frequency (RF) signal from at least one wireless serving communication unit; logic for decoding transmit power information from a received RF signal. The integrated circuit further comprises logic for determining from the decoded transmit power information whether a transmission from the at least one wireless serving communication unit is suitable for use as a timing reference; and logic for synchronising an operating frequency of the wireless communication unit to the received RF signal of the at least one wireless serving communication unit, if the transmission is determined to be suitable for use as a timing reference.

According to a third aspect of the invention, there is provided a wireless communication system adapted to support the communication unit of the first aspect of the invention.

According to a fourth aspect of the invention there is provided a method for frequency synchronising in a wireless communication unit. The method comprises: receiving a radio frequency (RF) signal from at least one wireless serving communication unit; decoding transmit power information from a received RF signal; and determining from the decoded transmit power information whether a transmission from the at least one wireless serving communication unit is suitable for use as a timing reference. If it is determined that the transmission is suitable for use as a timing reference, the method further comprises synchronising an operating frequency of the wireless communication unit to the received RF signal of the at least one wireless serving communication unit.

According to a fifth aspect of the invention, there is provided a computer-readable storage element having computer-readable code stored thereon for programming a signal processing logic module to perform a method for frequency synchronising a wireless communication unit. The code is operable for receiving a Radio Frequency (RF) signal from at least one wireless serving communication unit; decoding transmit power information from a received RF signal; and determining from the decoded transmit power information whether the at least one wireless serving communication unit is suitable for use as a timing reference. If it is determined that transmission is suitable for use as a timing reference, the code is further operable for synchronising an operating frequency of the wireless communication unit to the received RF signal of the at least one wireless serving communication unit.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Embodiments of the invention find particular applicability in a cellular communication system that supports a number of overlapping communication coverage areas, for example a communication system that comprises a combination of femto cells and macro cells. Embodiments of the invention may be used by any communication unit needing to frequency synchronise to another communication unit. For example, embodiments of the invention may be used by a user equipment (UE) comprising a wideband code division multiple access (WCDMA) receiver. Embodiments of the invention may be employed particularly by a femto cell receiver operating in a cellular communication system comprising both femto cell base-stations (termed access points (APs) hereafter) and macro-cell NodeBs. In particular, embodiments of the invention enable a femto cell downlink receiver to synchronise to, and use as a timing reference, a macro-cell NodeB's frequency and timing transmissions, whilst disregarding femto cell AP frequency and timing transmissions.

Those skilled in the art, however, will recognize and appreciate that the specifics of this example are merely illustrative of some embodiments, and that the teachings set forth herein are applicable in a variety of alternative settings. For example, since the teachings described hereafter do not depend on a particular cellular communication network conforming to any specific standard, it is envisaged that the teachings and inventive concept described herein can be applied to any type of cellular communication network, although a $3^{rd}$ generation partnership project (3GPP) network is shown in this embodiment. As such, other alternative implementations within cellular communication networks conforming to different standards are contemplated and are considered as being within the scope of the various teachings described.

Figure 1:
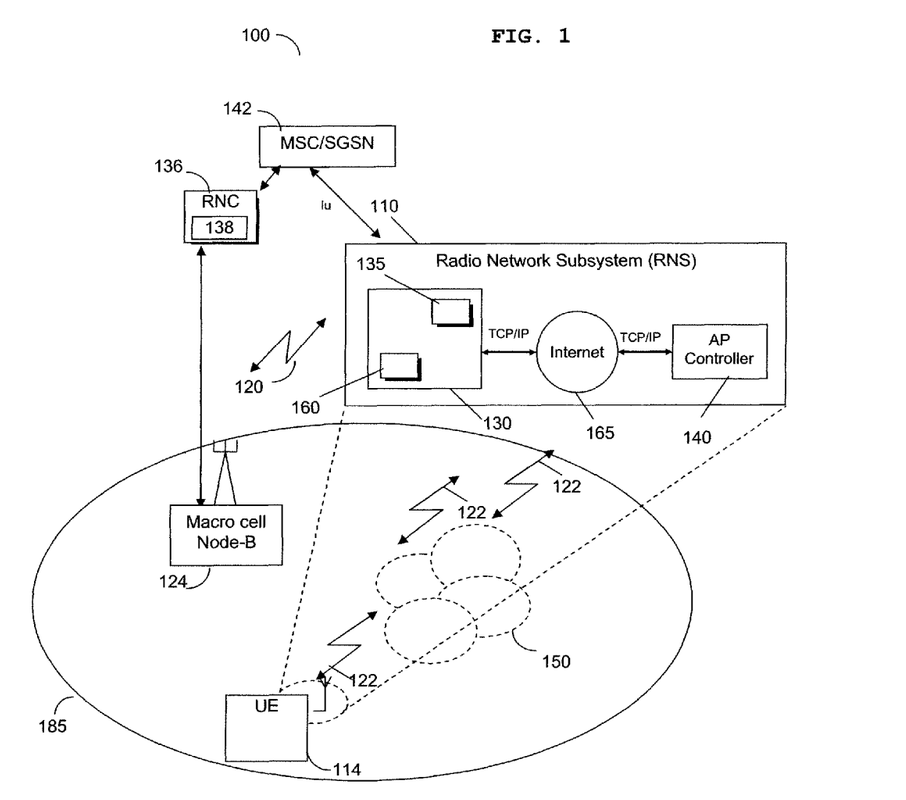
FIG. 1 illustrates an example of a cellular communication system that combines macro-cell and femto-cells, adapted to support frequency synchronisation in accordance with embodiments of the invention.

Referring now to the drawings, and in particular FIG. 1, an example of part of a 3GPP network, adapted in accordance with embodiments of the invention, is illustrated and indicated generally at 100. In FIG. 1, there is illustrated an example of a communication system combining macro cells 185 and femto cells 150 in accordance with one embodiment of the invention. In a femto cell network it is known that there may be a very large number of femto cells per macro cell. Thus, the coverage area of a single macro cell will inevitably encompass a coverage area of a large number of femto cells.

For the embodiment illustrated in FIG. 1, a radio network sub-system (RNS) comprises two distinct architectures to handle the respective macro cell and femto cell communications. In the macro cell scenario, the RNS comprises a radio network controller (RNC) 136 having, inter alia, processing logic module 138 and being operably coupled to a core network (CN) element 142, such as a serving general packet radio system (GPRS) support node (SGSN)/mobile switching centre (MSC), as known.

In a femto cell scenario, an RNS 110 comprises a network element in a form of an Access Point (AP) 130, and a controller in a form of an AP controller 140. As will be appreciated by a skilled artisan, an Access Point (AP) 130 is a communication element that facilitates access to a communication network via a communication cell, such as a femtocell. One application that has resulted in the interest in femto cell technology is that an AP 130 may be purchased by a member of the public and installed in their home. The AP 130 may then be connected to an AP controller 140 over the owner's broadband internet connection 165.

Thus, an AP 130 may be considered, in one embodiment of the invention, as being a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP system may comprise some Node-B functionality and some aspects of radio network controller (RNC) 136 functionality. The AP communicates with UEs, such as UE 114, via a wireless interface (Uu) 122.

The AP controller 140 may be coupled to the core network (CN) element 142 via an Iu interface, as shown. In this manner, the AP 130 is able to provide voice and data services to a cellular handset, such as UE 114, in a femto cell 150 in contrast to the macro cell 185, in the same way as a conventional Node-B, but with the deployment simplicity of, for example, a Wireless Local Area Network (WLAN) access point.

In macro cell communications, base stations, or NodeB's in 3GPP parlance, are guaranteed to have high frequency stability, as they employ expensive and, hence, highly stable crystal oscillators. Accordingly, it has been proposed that femto cell APs incorporate a downlink (DL) receiver radio sub-system, in a similar manner to a UE receiver, in order to wirelessly receive transmissions from other wireless serving communication units, such as NodeBs, for use as timing references for correcting any frequency drift in their often inexpensive and hence less accurate crystal oscillators.

As outlined above, it is not desirable that a femto cell DL receiver synchronises to another femto cell AP for the purpose of correcting any frequency drift in its crystal oscillator, since those other femto cell APs will typically also employ inexpensive and therefore less accurate VCTCXO crystals, and thus will also suffer from frequency drift.

In accordance with some embodiments of the invention, a communication unit, such as the femto AP 130, comprises receiver circuitry 135 for receiving radio frequency (RF) signals 120 from at least one wireless serving communication unit, such as a macro cell NodeB 124 and for receiving a number of radio frequency (RF) signals 122 from a number of femto cell UEs, such as UE 114. The femto AP 130 also comprises a signal processing logic module 160 arranged to decode information within the received RF signals 120 from the at least one wireless serving communication unit 124. In particular, the signal processing logic module 160 is arranged to decode transmit power information within each received RF signal 120 and to determine from the decoded transmit power information whether the transmissions from the at least one wireless serving communication unit 124 are suitable for use as a timing reference. If it is determined that transmissions from the at least one wireless serving communication unit 124 are suitable for use as a timing reference, the signal processing logic module 160 is then arranged to synchronise an operating frequency of the communication unit 130 to the received RF signal 120.

In this manner, the signal processing logic module 160 is able to differentiate between a reliable timing reference source, such as a macro cell NodeB, and an unreliable timing reference source, such as a femto cell AP, based on the respective transmit power information, for example as described in greater detail below. Accordingly, the wireless communication unit is able to selectively fine synchronise and frequency lock its crystal oscillator to a high accuracy (typically, better than +/−0.02 PPM) only with those timing reference sources that are deemed reliable, and therefore suitable.

In accordance with some further embodiments of the invention, the signal processing logic module 160 of the femto AP 130 may be arranged to determine whether transmissions from the wireless serving communication unit are suitable for use as a timing reference by comparing a value within the decoded transmit power information to a threshold value. For example, if the value within the decoded transmit power information is less than the threshold value, the signal processing logic module 160 may be arranged to determine that the transmissions from the at least one wireless serving communication unit are not suitable for use as a timing reference.

3GPP Technical Specification (TS) 25.104 identifies three classes of base station: Wide Area Base Stations (e.g. a macro cell base station); Medium Range Base Stations (e.g. a micro cell base station); and Local Area Base Stations (e.g. a femto or pico cell base station). 3GPP TS 25.104 also specifies a maximum output power for each class of base station. In particular, the maximum output power for a Medium Range Base Station is limited to 38 dBm, whilst the maximum output power for a Local Area Base Station is limited to 24 dBm. In practice, Local Area Base Stations such as femto cell APs are unlikely to exceed a maximum output power of 14 dBm. No limit is set for the maximum output power for a Wide Area Base Station.

Typically, a Medium Range Base Station (e.g. a micro cell base station) will employ expensive and, hence, highly stable crystal oscillators, in the same manner as for Wide Area Base Stations (e.g. macro cell base stations). Accordingly, it will be appreciated that, for the purpose of simplicity and clarity, references herein to NodeBs and macro cell base stations encompasses both Wide Area (macro) Base Stations and Medium Range (micro) Base Stations, unless otherwise expressed.

This classification of base stations, and more particularly the specification of maximum output power levels for the different classes of base stations, provides a means by which, for example, femto cells may be differentiated from macro cells. Accordingly, by identifying the class of base station from which an RF signal originates, the suitability of the RF signal as a timing reference may be determined based on the likely stability of the originating base station's crystal oscillator, or other timing source.

It is contemplated that for some embodiments of the invention, the signal processing logic module 160 of, for the illustrated embodiment, the femto AP 130 may be arranged to decode transmit power information for a common channel broadcast by, for example, the NodeB 124, and to determine from the decoded common channel transmit power information whether transmissions from the NodeB 124 are suitable for use as a timing reference.

For example, in Wideband Code Division Multiple Access (WCDMA) cellular systems such as UMTS, and some other Code Division Multiple Access (CDMA) communication systems, a Primary Common Pilot CHannel (P-CPICH) is broadcast by all base stations with a constant power and of a known bit sequence. Typically, the transmit power of the P-CPICH is around 10% (approximately 10 dB less than) that of the maximum output power for the respective base station.

Each base station in a UMTS network broadcasts the transmit power level for its primary CPICH within an information element (IE) labeled "Primary CPICH TX Power", which is broadcast within a system information message. More specifically, a UMTS network utilises a Radio Resource Control (RRC) protocol. The RRC protocol is defined in the Universal Mobile Telecommunications System (UMTS) Radio Resource Control (RRC) Protocol specification (3GPP TS 25.331), and forms part of the network layer between (typically) a UE and the UMTS Terrestrial Radio Access Network (UTRAN). The RRC protocol comprises connection management procedures, which, in turn, comprise the broadcasting of system information by the UTRAN.

In particular, system information elements, such as IE "Primary CPICH TX Power", are broadcast in system information blocks, which group together system information elements of the same nature. Typically, the information element "Primary CPICH TX Power" is broadcast within System Information Block 5 (SIB 5), or SIB 5bis. A generic 'SYSTEM INFORMATION' message is used to convey the system information blocks on a Broadcast Control CHannel (BCCH) logical channel, which, in turn, may be mapped onto either a Broadcast CHannel (BCH) or Forward Access CHannel (FACH) transport channel. The BCH transport channel is, in-turn, mapped on the Primary Common Control Physical RF Channel (P-CCPCH).

In this manner, and in accordance with some embodiments of the invention, a wireless communication unit, such as the femto AP 130 of FIG. 1, may be adapted to receive an RF signal comprising a system information message from a wireless serving communication unit (e.g. a base station), and decode transmit power information in the form of the IE "Primary CPICH TX Power" within the system information message, in order to retrieve a transmit power value for the primary CPICH of that wireless serving communication unit. The femto AP 130 may then determine from the decoded transmit power value for the primary CPICH whether the transmissions from that wireless serving communication unit are suitable for use as a timing reference.

By way of example, as previously mentioned, the transmit power of the P-CPICH for a base station is typically around 10% (approximately 10 dB less than) that of its maximum output power. Thus, for a Medium Range Base Station limited to a maximum output power level of 38 dBm, the transmit power of its P-CPICH will be around 28 dBm. This is in contrast to a Local Area Base Station, whose maximum output power is limited to 24 dBm, less than the typical CPICH transmit power for a Medium Range Base Station.

Thus, the signal processing logic module 160 of the femto AP 130 of FIG. 1 may be arranged to compare a value within the decoded transmit power information to a threshold value. Accordingly, by setting this threshold value to, say, 24 dBm, and by comparing the IE "Primary CPICH TX Power" value for a base station to this threshold, if the IE "Primary CPICH TX Power" value is less than the threshold value of 24 dBm, it may be determined that the base station comprises a Local Area Base Station (e.g. a femto AP), and thus is not suitable for use as a timing reference. Consequently, the signal processing logic module 160 is able to limit those RF signals that are used as timing references for correcting frequency drift of the crystal oscillator to those originating from the more reliable macro cell base stations.

As will be appreciated by a skilled artisan, by using transmit power information broadcast by a base station, such as the primary CPICH transmit power information, only modifications to the communication unit performing the frequency synchronisation are required in order to implement the invention.

As previously mentioned, 3GPP TS 25.104 identifies the three classes of base station, and specifies a maximum output power for each class of base station. In addition, 3GPP TS 25.104 also specifies a frequency error minimum requirement for each class of base station. The frequency error minimum requirement for Medium Range Base Stations and for Local Area Base Stations is specified as ±0.1 ppm, whilst the frequency error minimum requirement for Wide Area Base Stations is ±0.05 ppm. Accordingly, RF signals received from Wide Area Base Stations may be considered as more reliable than those from, say, Medium Range or Local Area Base Stations due to their more stringent frequency error minimum requirement. Thus, it is envisaged in one embodiment of the invention that the threshold value may alternatively be set to, say, 38 dBm, such that only Wide Area Base Stations may be determined as being suitable for use a timing references.

In accordance with some embodiments of the invention, it is envisaged that the threshold value with which the decoded transmit power information is compared may be dynamically configurable. In this manner, the properties of the transmit power information that determine whether a wireless serving communication unit is suitable for use as a timing reference may be configured, for example by a core network component of the wireless communication network, such as network element 142 of FIG. 1. Accordingly, signal processing logic module 160 of the femto AP 130 may be arranged to configure the threshold value according to information received from, for example, the network element 142.

As previously mentioned, if it is determined that the transmissions from the at least one wireless serving communication unit are suitable for use as a timing reference, the signal processing logic module 160 is arranged to synchronise the operating frequency of the communication unit to the received RF signal of the at least one wireless serving communication unit.

For example, the signal processing logic module 160 may be arranged to use the received RF signal of the at least one wireless serving communication unit to correct a frequency drift of a crystal oscillator from which the operating frequency of the wireless communication unit is derived. More specifically, the signal processing logic module 160 may be arranged to use the received RF signal as a singular reference with which to synchronise and correct the frequency drift of the crystal oscillator.

Alternatively, it is envisaged that the signal processing logic module 160 may be arranged to use the received RF signal of the at least one wireless serving communication unit to update an aggregate frequency error estimation with which to correct the frequency drift of a crystal oscillator. For example, the signal processing logic module may be arranged to calculate a statistical aggregate (for example an average or median) frequency drift. The signal processing logic module may then adjust (correct) the operating frequency of the crystal oscillator to synchronise to an average or median frequency.

3GPP Technical Specification (TS) 25.215 specifies two WCDMA downlink signal quality measures, CPICH EcNo (Common Pilot Channel Energy-per-chip-to-Noise) and CPICH RSCP (Common Pilot CHannel Received Signal Code Power). These two WCDMA downlink signal quality measures may be used as signal quality criteria for determining the suitability of the received RF signal for fine frequency estimation. The CPICH EcNo is defined as the received energy per chip divided by noise power spectral density measured specifically on the CPICH channel of the received RF WCDMA signal and the reference point for CPICH EcNo is the antenna connector of the femto cell. The CPICH RSCP is defined in 3GPP TS 25.215 as the received power on the CPICH channel after WCDMA despreading and the reference point of measurement is also the femto cell antenna connector.

For example, CPICH EcNo measured on a received downlink RF signal from the at least one wireless serving communication unit of greater than −20 dB may be considered as a suitable metric for doing fine frequency estimation.

Alternatively, a CPICH RSCP measured on a received downlink RF signal from the at least one wireless serving communication unit of greater than −110 dBm is considered as a suitable metric for doing fine frequency estimation.

Thus, and in accordance with some embodiments of the invention, the signal processing logic module 160 may be arranged to measure the received RF signal quality of the at least one wireless serving communication unit and perform fine frequency estimation to correct a frequency drift of the crystal oscillator from which the operating frequency of the wireless communication unit is derived. The signal processing logic module 160 may perform the correction if the signal quality measure, for example CPICH EcNo or CPICH RSCP, is above a predetermined or an Operator selected threshold, for example −20 dB or −110 dBm respectively in the above example. In accordance with some embodiments of the invention, the particular criteria, for example EcNO or RSCP, used for determining the quality of the received RF signal and/or the threshold with which the criteria is compared may be configurable.

Figure 2:
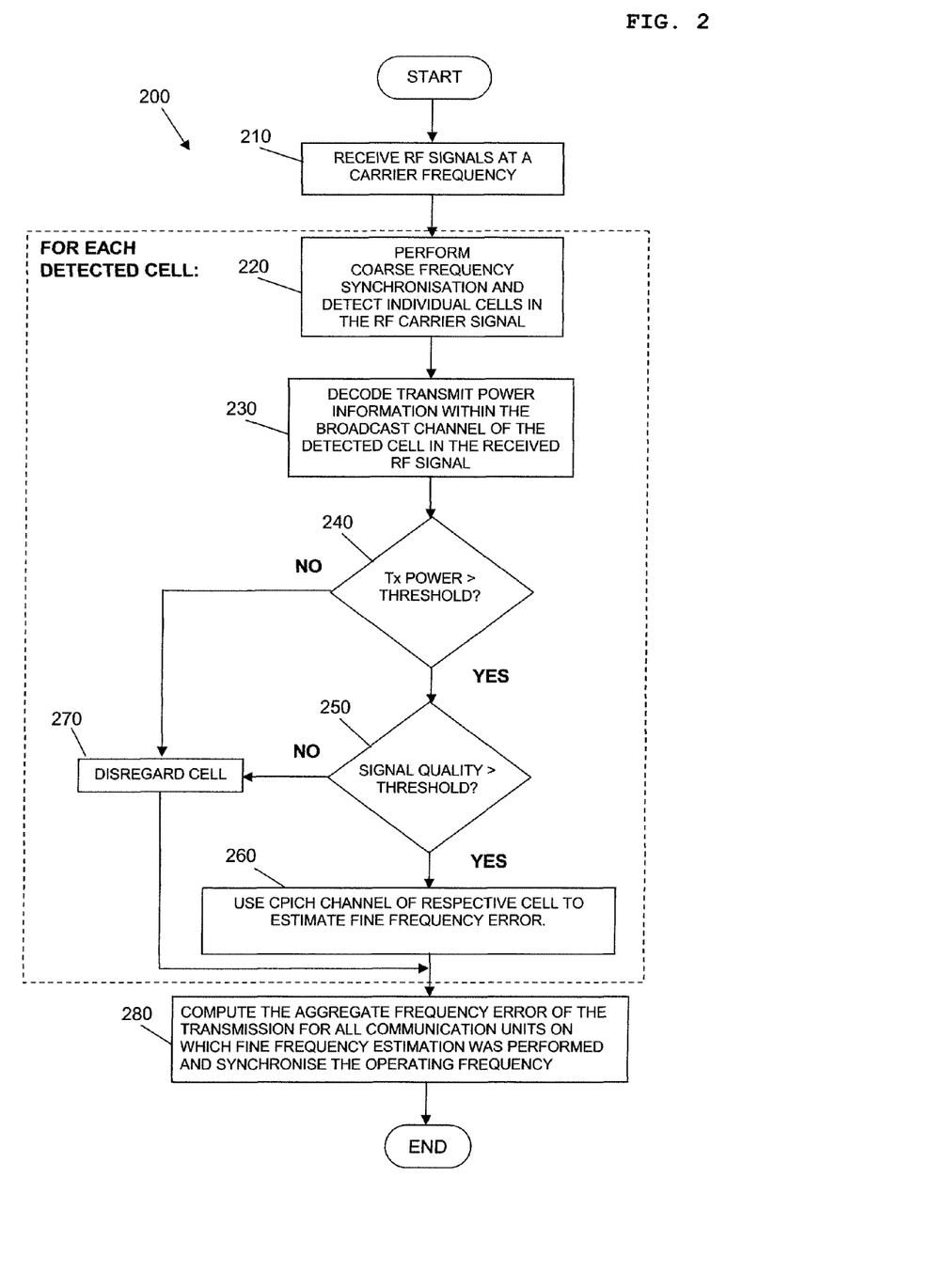
FIG. 2 illustrates an example of a simplified flowchart of a method for frequency synchronising a wireless communication unit according to some embodiments of the invention.

Referring now to FIG. 2, there is illustrated an example of a simplified flowchart 200 of a method for frequency synchronising a wireless communication unit according to some embodiments of the invention.

The method starts at step 210 with the receiving of an RF signal at a carrier frequency. This carrier frequency may contain a combination of signals from macro cells and femto cells on substantially the same frequency. Next, in step 220, coarse synchronisation is performed, and scrambling codes from individual cells in that carrier frequency are detected. Notably, the synchronisation process may involve performing a coarse frequency synchronisation procedure so that the residual frequency error between the communication unit's crystal oscillator and the received RF signal(s) is reduced to within a range that ensures good Rake receiver performance under moderate-to-low Signal-to-noise ratio (SNR) environments. For example, an acceptable range of residual frequency error for Rake receiver operation may be between +/−0.2 PPM to +/−0.1 PPM.

Then, for each detected cell, the method comprises the following steps. In step 230, transmit power information, for example a primary CPICH transmit power level, within the broadcast channel of the respective RF signal is decoded, for example using a Rake receiver based decoder. The method then moves on to step 240, with determining from the decoded transmit power information whether the transmissions from respective wireless serving communication unit (cell) are suitable for use as a timing reference. More particularly for the illustrated embodiment, it is determined whether the transmit power information is greater than a threshold value.

If the transmit power information is greater than the threshold value, in step 240, the method moves on to step 250, which comprises measuring the signal quality of the transmission from the respective cell and comparing it against a further threshold. If the measured signal quality of the transmission is greater than the further threshold, it is understood that the transmissions from the respective wireless serving communication unit are suitable for use as a timing reference. Accordingly, the method moves on to step 260, which comprises performing fine frequency error estimation on the P-CPICH channel of the transmission from the respective wireless serving communication unit that are deemed suitable for use as a timing reference in step 250. Finally, step 280 involves computing the aggregate frequency error of the transmission for all the communication units on which fine frequency estimation was performed in step 260 and then synchronising the operating frequency of the wireless communication unit's crystal oscillator, for example to a high accuracy of better than 0.02 PPM. The method then ends.

Referring back to steps 240 and 250, if the transmit power information is not greater than the threshold value in step 240, or the signal quality is not greater than the further threshold value in step 250, the method moves to step 270, and the cell is disregarded from the point of view of a timing reference for fine synchronising the operating frequency of the wireless communication unit.

More particularly, the fine frequency synchronisation process is operated only on those cells that are identified as suitable timing references and in addition have a suitable received signal quality measure at the communication unit's antenna. For example, the signal quality measure may be the received CPICH EcNo that is the signal-to-noise ratio (SNR) of the Common Pilot Channel in the received signal or the Received Signal Code Power of the CPICH channel in the received signal (CPICH RSCP) from that particular cell. It is envisaged in one embodiment of the invention that the chosen signal quality measure and/or their threshold values that determine a good metric may be configurable by the Network Operator.

In addition, in the case where more than one suitable timing source qualifies or satisfies the signal quality measure, the statistical aggregate fine frequency estimate of those cells may be used.

Figure 3:
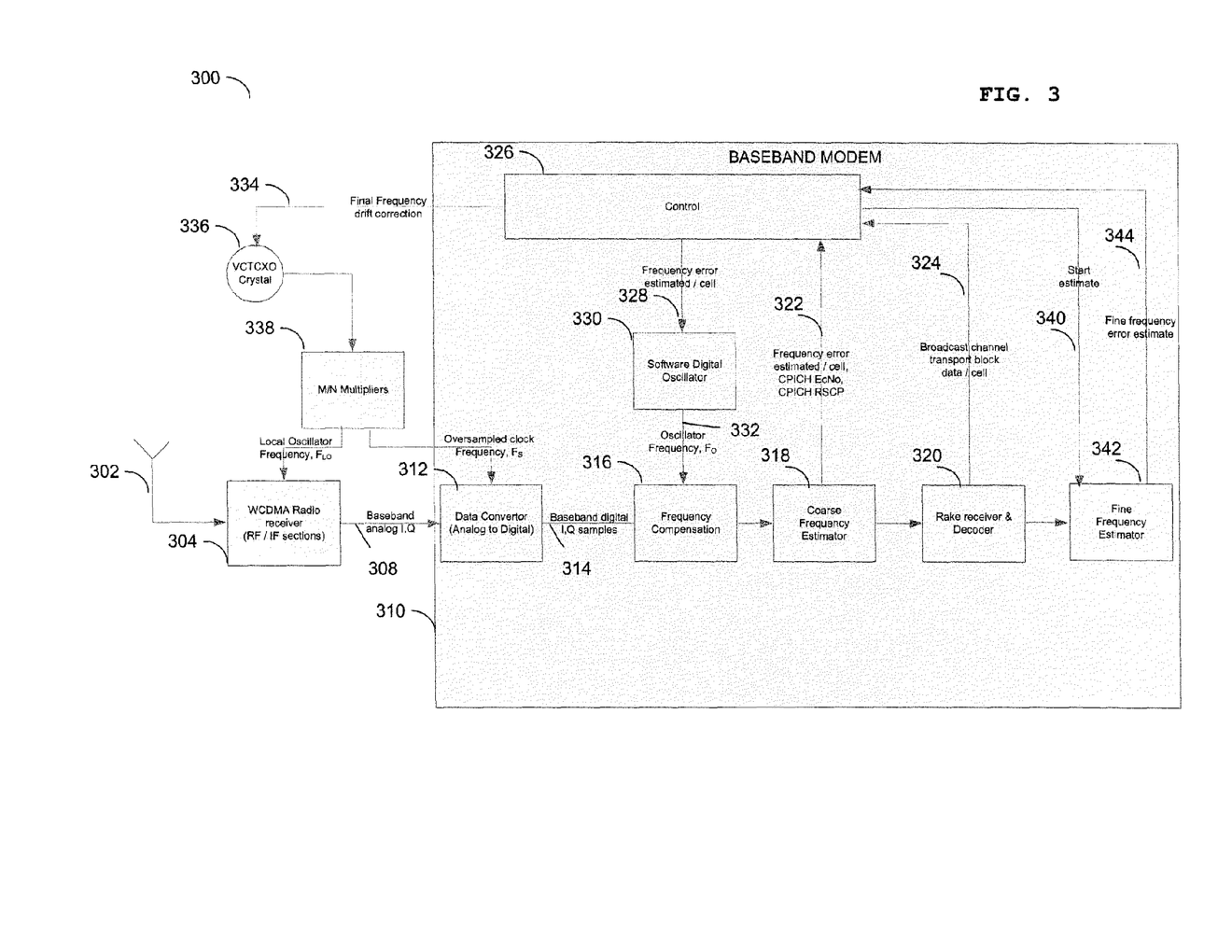
FIG. 3 illustrates a block diagram of a femto cell downlink communication unit and particularly a frequency synchronisation arrangement therein, adapted in accordance with embodiments of the invention.

Referring now to FIG. 3, a block diagram of a communication unit 300, and particularly a communication unit's frequency synchronisation sub-system therein, adapted in accordance with embodiments of the invention, is illustrated. In one embodiment of the invention, the communication unit may be the femto cell AP 130 of FIG. 1.

The communication unit 300 comprises an antenna 302 for receiving transmissions from a macro cell NodeB and/or a femto cell AP. The antenna 302 is operably coupled to radio receiver block 304 comprising known Radio Frequency (RF) circuitry and (if appropriate in some embodiments) Intermediate Frequency (IF) circuits that are capable of receiving and down-converting the downlink RF signals from the antenna 302, to, say, 5 MHz baseband IQ analogue signals 308. These IQ analogue signals are then provided to a baseband modem 310.

A data converter 312, for example in a form of analogue-to-digital converter, converts the down-converted baseband analogue (IQ) signals 308 to baseband digital (IQ) data samples 314 at, say, an over-sampling rate of $F_s$ (for example, 15.36 MHz). The over-sampling rate ($F_s$) is derived from the VCTCXO crystal 336 based on a ratio (M/N) set by multiplier logic module 338. The VCTCXO crystal 336 also provides the local oscillator (LO) frequency, $F_{LO}$, to radio receiver block 304, to ensure correct base-band frequency down-conversion.

In embodiments of the invention, frequency drift may be coarsely compensated by coarse frequency compensation logic module 316, based on compensation I/Q signals generated by the software digital oscillator 330. Baseband coarse frequency estimator logic module 318 estimates a residual frequency error in the IQ data samples following the frequency compensation, and forwards 322 the residual frequency error estimation to control logic module 326, along with the signal quality measurements, for example CPICH EcNo and CPICH RSCP measurements. Control logic module 326 is arranged to process the residual frequency error estimation and inform 328, 334 the software digital oscillator 330 or the hardware VCTCXO 336 of the amount of frequency adjustment to effect using an appropriate synthesizing algorithm, in order to correct the frequency drift.

The down-converted, coarse frequency-compensated (for example accurate to between +/−0.2 PPM and +/−0.1 PPM), baseband digital IQ samples are then input to a WCDMA rake receiver and decoder logic module 320. In one embodiment of the invention, rake receiver and decoder logic module 320 is arranged to decode a broadcast transport channel of the received signal, which contains the transmit power information and forwards the transport blocks 324 to the control logic module 326.

The control logic module decodes the System Information Block 5 (SIB 5) that contains the information element "Primary CPICH Transmit Power" and compares it with a threshold to determine whether the channel being received is from, say, a femto cell or a macro cell. Control logic module 326 is then able to decide whether or not to perform fine frequency synchronisation on the decoded channel, for example if it determines that the RF signal is from an AP of a femto cell, or to initiate further fine frequency estimation if it determines that the RF signal is from, say, a NodeB of a macro cell.

If the control logic module 326 determines that the RF signal is from, say, a NodeB of a macro cell, the control logic module 326 may compare the signal quality measure (CPICH EcNo or CPICH RSCP) of the RF signal from the macro cell against a set threshold. If the RF signal exceeds this threshold, the control logic module 326 may then initiate 340 a Fine Frequency estimation procedure 342 that computes and reports 344 the average frequency error over a long period of time (tens or hundreds of frames under low-to-moderate SNR conditions) in order to obtain a high accuracy of typically better than 0.02 PPM. Also, the control logic 326 may use the received frequency error 344 in its aggregate frequency error estimation, for example if it determines that they emanate from a NodeB of a macro cell. Note that the aggregate is taken in order to filter out any frequency drifts in individual NodeB's crystal oscillator themselves (within +/−0.05 PPM as established earlier), and, thus, arrive at a better estimate. The control logic module 326 may inform 334 the hardware VCTCXO 336 to only correct the residual fine frequency error, of typically better than +/−0.02 PPM, and not the software digital oscillator 328, 330 since software digital oscillators typically have a finite lower limit of frequency generation capability of around 0.05 PPM. Hence, in practice, they will not be able to generate I,Q compensation waveforms any lower that 0.05 of the frequency limit.

Advantageously, with the architecture described in FIG. 3, there is no need for the femto cell downlink receiver to repeatedly correct/tune the hardware VCTCXO crystal 336 to each and every base station (NodeB and AP) within its coverage area in order to synchronise to each cell. In using a software digital oscillator 330, and control logic module 326 configured to not initiate any fine frequency error estimation on a femto cell transmission, as described above, the femto cell AP's baseband modem 310 is able to synchronise in software solely to macro cells and, if more than one macro cell is tuned to, arrive at a mean fine frequency drift of the selected macro cells.

The femto cell downlink receiver's baseband modem 310 then physically tunes the hardware VCTCXO crystal 336 a single time, so that it is within the desired performance range for all receivable macro cell NodeB transmissions.

Advantageously, physically tuning the hardware VCTCXO crystal 336 a single time remains accurate until the next Network Listen is initiated by the Operator, which would typically be in a couple of days or a week, depending upon the VCTCXO part's drift rate and also the accuracy of the fine frequency estimation procedure. In this regard, in one embodiment of the invention, the more accurate the frequency estimation result, the larger the time spacing between successive Network Listen initiations by the Operator, since it would take longer for the crystal oscillator's operating frequency to drift beyond a frequency that necessitates a correction via Network Listen initiation.

As will now be appreciated by a skilled artisan, in a worst case scenario for known approaches currently adopted, a femto cell downlink receiver may be configured by the Network Operator to perform a Network Listen scan of the whole 3GPP DL frequency band (2.11 GHz to 2.17 GHz) for potential macro/femto cells. In which case, fine frequency synchronisation may be initially performed to each detected macro/femto cell to an accuracy of better than +/−0.02 PPM, and then discarding the frequency error estimation result if it is determined from the decoded primary CPICH transmit power information to be an AP in a neighbouring femto cell. The above process may then be repeated for each of the detected cells in turn. This is very time consuming and unnecessary from the rake receiver decoder point of view.

A more time optimum method, according to some embodiments of the invention, is to initially coarse synchronise with each detected wireless serving communication unit, such coarse synchronisation being sufficient to be able to operate the rake receiver based decoder (that is to a frequency synchronisation accuracy of around +/−0.2 PPM to +/−0.1 PPM). Once the coarse synchronisation and rake decoding has been performed, embodiments of the invention propose to determine from the decoded primary CPICH transmit power information whether the RF signal is from a macro cell. If it is determined that the RF signal is from a macro cell, embodiments propose to run the fine frequency estimation procedure for, say, 10s worth of frames to achieve a high frequency accuracy of better than +/−0.02 PPM. According to some exemplary embodiments of the invention this operation is performed only on those macro cells that qualify with a sufficient signal quality measure, as described before, thus preventing the fine frequency procedure running on APs that were determined as femto cells. As a result, a time saving of many orders of seconds may be achieved in the case where there are many femto cells and macro cells in a neighbourhood of the femto cell running Network Listen.

It is envisaged that the aforementioned embodiments aim to provide one or more of the following advantages:

(i) An ability to enable a communication unit to automatically correct frequency drift arising in its crystal oscillator, whilst allowing the use of a low cost crystal oscillator.

(ii) Enable a femto cell downlink receiver to tune to multiple reference signals and select suitable timing signals to synchronise with. For example, when a femto cell is operating in a combined macro cell/femto cell environment, the femto cell is able to distinguish between macro cell and femto cell frequency transmissions. The DL receiver is then able to target only the macro cell signals for fine frequency estimation, and disregard any received femto cell signals. The DL receiver may also utilise an average frequency signal from the selected macro cells to synchronise its internal signals to.

(iii) The properties of the transmit power information that may be used to determine whether a base station transmission is suitable for use as a timing reference may be configured, for example by a core network element.

(iv) The inventive concept only requires supporting functionality to be provided within a femto cell, and thus, does not require supporting functionality to be provided within the core network.

Figure 4:
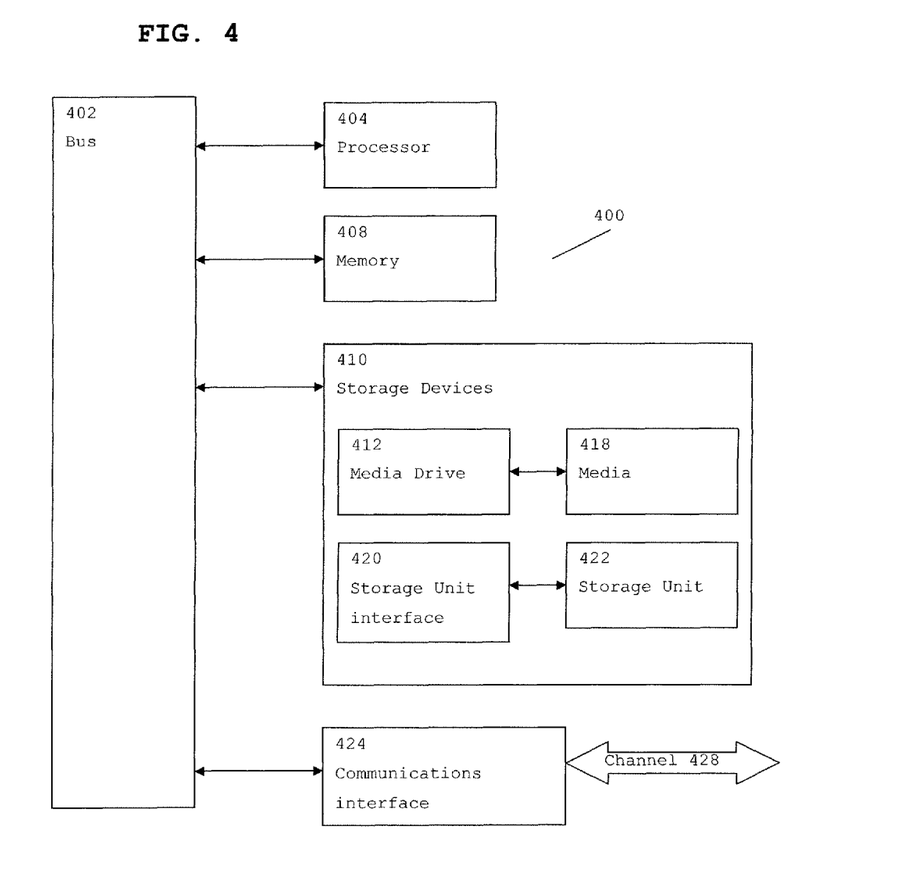
FIG. 4 illustrates a typical computing system that may be employed to implement processing functionality in embodiments of the invention.

FIG. 4 illustrates a typical computing system 400 that may be employed to implement processing functionality in embodiments of the invention. Computing systems of this type may be used in UEs or femto cell downlink receiver (in particular, processing logic module in UE or a femto cell modem that handles frequency synchronisation). Those skilled in the relevant art will also recognize how to implement the invention using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special-purpose processing engine such as, for example, a microprocessor, microcontroller or other control logic module. In this example, processor 404 is connected to a bus 402 or other communications medium.

Computing system 400 can also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory (ROM) or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 418 may include, for example, a hard disk, floppy disk, magnetic tape, optical disk, CD or DVD, or other fixed or removable medium that is read by and written to by media drive 412. As these examples illustrate, the storage media 418 may include a computer-readable storage medium having particular computer software or data stored therein.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 can also include a communications interface 424. Communications interface 424 can be used to allow software and data to be transferred between computing system 400 and external devices. Examples of communications interface 424 can include a modem, a network interface (such as an Ethernet or other NIC card), a communications port (such as for example, a universal serial bus (USB) port), a PCMCIA slot and card, etc. Software and data transferred via communications interface 424 are in the form of signals which can be electronic, electromagnetic, and optical or other signals capable of being received by communications interface 424. These signals are provided to communications interface 424 via a channel 428. This channel 428 may carry signals and may be implemented using a wireless medium, wire or cable, fibre optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 408, storage device 418, or storage unit 422. These and other forms of computer-readable media may store one or more instructions for use by processor 404, to cause the processor to perform specified operations. Such instructions, generally referred to as 'computer program code' (which may be grouped in the form of computer programs or other groupings), when executed, enable the computing system 400 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 400 using, for example, removable storage drive 418, drive 412 or communications interface 424. The control logic module (in this example, software instructions or computer program code), when executed by the processor 404, causes the processor 404 to perform the functions of the invention as described herein.

It will be appreciated that, for clarity purposes, the above description has described embodiments of the invention with reference to different functional units or logic module elements or signal processors. However, it will be apparent that any suitable distribution of functionality between different functional units or logic module elements or signal processors, for example with respect to the UE, may be used without detracting from the invention. For example, it is envisaged that functionality illustrated to be performed by separate processors or controllers or logic module elements may be performed by the same processor or controller or logic module element. Hence, references to specific functional or logical units are only to be seen as references to suitable means for providing the described functionality, rather than indicative of a strict logical or physical structure or organization.

Some aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, a method and apparatus for performing frequency synchronisation, for example by a femto AP in a cellular communication system that combines macro cells and femto cells, has been described that may alleviate at least some of the shortcomings of past and present techniques and/or mechanisms.

The invention claimed is:

1. A communication unit comprising:
a receiver configured to receive radio frequency (RF) signals from at least one wireless serving communication unit; and
a signal processing logic module arranged o decode transmit power information from a received RF signal sent by the at least one wireless serving communication unit, the signal processing logic module arranged to:
determine from the decoded transmit power information whether a transmission from the at least one wireless serving communication unit is suitable for use as a timing reference; and
if it is determined that the transmission is suitable for use as a timing reference, to synchronize an operating frequency of the communication unit to the received RF signal of the at least one wireless serving communication unit.

2. The communication unit of claim 1 wherein the signal processing logic module is arranged to decode transmit power information received on a common channel broadcast by the transmission from the at least one wireless serving communication unit, and to determine from the decoded common channel transmit power information whether the transmission from the at least one wireless serving communication unit is suitable for use as a timing reference.

3. The communication unit of claim 2 wherein the signal processing logic module is arranged to decode a system information message within the received RF signal, the system information message comprising the transmit power information for the common channel broadcast by the at least one wireless serving communication unit.

4. The communication unit of claim 2 wherein the signal processing logic module is arranged to decode transmit power information for a Primary Common Pilot Channel (P-CPICH) of the at least one wireless serving communication unit, and to determine from the decoded transmit power for the primary CPICH whether the transmission from the at least one wireless serving communication unit is suitable for use as a timing reference.

5. The communication unit of claim 1 wherein the signal processing logic module is arranged to determine whether the transmission from the at least one wireless serving communication unit is suitable for use as a timing reference by comparing a value extracted from the decoded transmit power information to a threshold value.

6. The communication unit of claim 5 wherein, if the value extracted from the decoded transmit power information is less than the threshold value, the signal processing logic module is arranged to determine that the at least one wireless serving communication unit is not suitable for use as a timing reference.

7. The communication unit of claim 5 wherein the threshold value is configurable.

8. The communication unit of claim 7 wherein the signal processing logic module is arranged to configure the threshold value according to information received from a core network component of a wireless communication network.

9. The communication unit of claim 5 wherein the signal processing logic module is further arranged, upon determining that the transmission from the at least one wireless serving communication unit is suitable for use as a timing reference, to determine whether the measured signal quality of the transmission received from the at least one wireless serving communication unit is above a further threshold.

10. The communication unit of claim 9 wherein the further threshold is Operator configurable.

11. The communication unit of claim 9 wherein the received quality measured comprises at least one from a group consisting of: Common Pilot Channel Energy-per-chip-to-Noise, (CPICH Ec/No), Common Pilot Channel Received Signal Code Power (CPICH RSCP).

12. The communication unit of claim 1 wherein, in response to the signal processing logic module determining that the transmission from the at least one wireless serving communication unit is suitable for use as a timing reference, the signal processing logic module is arranged to use the received RF signal of the at least one wireless serving communication unit to correct a frequency drift of a crystal oscillator from which the operating frequency of the wireless communication unit is derived.

13. The communication unit of claim 12 wherein, in response to the signal processing logic module determining that the transmission from the at least one wireless serving communication unit is suitable for use as a timing reference, the signal processing logic module is further arranged to use the received RF signal of a plurality of wireless serving communication units to update an aggregate frequency error estimation with which to correct a frequency drift of a crystal oscillator from which the operating frequency of the wireless communication unit is derived.

14. The communication unit of claim 12 wherein, coarse frequency synchronization is performed to each detected cell, such that a rake receiver based decoder is able to decode received signals.)

15. The communication unit of claim 14 wherein if it is determined from a decoded primary CPICH transmit power information that the received signal is from a macro cell, a fine frequency estimation operation is performed for a number of received time frames.

16. The communication unit of claim 15 wherein the fine frequency estimation operation is performed only on those macro cells that qualify with a sufficient signal quality measure.

17. The communication unit of claim 1 wherein the signal processing logic module is further arranged, prior to decoding transmit power information from the received RF signal, to coarse synchronize with at least one wireless serving communication unit.

18. The communication unit of claim 1 wherein the signal processing logic module is arranged to:
  determine from the decoded transmit power whether the at least one wireless serving communication unit comprises a femto cell access point; and
  if it is determined that the at least one wireless serving communication unit comprises a femto cell access point, to determine that the at least one wireless serving communication unit is unsuitable for use as a timing reference.

19. The communication unit of claim 1 wherein the communication unit comprises a femto cell access point.

20. An integrated circuit comprising:
  a logic for receiving a radio frequency (RF) signal from at least one wireless serving communication unit;
  a logic for decoding transmit power information from a received RF signal;
  a logic for determining from the decoded transmit power information whether a transmission from the at least one wireless serving communication unit is suitable for use as a timing reference; and
  a logic for synchronizing an operating frequency of the communication unit to the received RF signal of the at least one wireless serving communication unit.

21. A wireless communication system adapted to support the communication unit of claim 1.

22. A method for frequency synchronizing a wireless communication unit, the method comprising:
  receiving a Radio Frequency (RF) signal from at least one wireless serving communication unit;
  decoding transmit power information from a received RF signal;
  determining from the decoded transmit power information whether a transmission from the at least one wireless serving communication unit is suitable for use as a timing reference; and
  if it is determined that the transmission is suitable for use as a timing reference,
  synchronizing an operating frequency to the received RF signal of the at least one wireless serving communication unit.

23. A non-transitory computer-readable medium having computer-readable code stored thereon for programming signal processing logic module to perform a method for frequency synchronising a wireless communication unit, the code operable for at the wireless communication unit:
  receiving a Radio Frequency (RF) signal from at least one wireless serving communication unit;
  decoding transmit power information from a received RF signal;
  determining from the decoded transmit power information whether a transmission from the at least one wireless serving communication unit is suitable for use as a timing reference; and
  if it is determined that the transmission is suitable for use as a timing reference,
  synchronising an operating frequency to the received RF signal of the at least one wireless serving communication unit.

* * * * *